(12) United States Patent
Clark et al.

(10) Patent No.: US 7,788,157 B2
(45) Date of Patent: Aug. 31, 2010

(54) METHOD FOR BUSINESS TO BUSINESS COLLABORATIVE VIRAL ADOPTION

(75) Inventors: Gregory Scott Clark, San Mateo, CA (US); Christian Buckley, Brentwood, CA (US); Chris Haag, Martinez, CA (US)

(73) Assignee: E2open, Inc., Foster City, CA (US)

( * ) Notice: Subject to any disclaimer, the term of this patent is extended or adjusted under 35 U.S.C. 154(b) by 415 days.

(21) Appl. No.: 09/967,905

(22) Filed: Sep. 28, 2001

(65) Prior Publication Data

US 2005/0209950 A1    Sep. 22, 2005

(51) Int. Cl.
    *G06Q 40/00*    (2006.01)
(52) U.S. Cl. ........................................................ 705/37
(58) Field of Classification Search ................... 705/26, 705/7, 42, 40, 44, 35–37
    See application file for complete search history.

(56) References Cited

U.S. PATENT DOCUMENTS

| 5,497,317 | A |   | 3/1996 | Hawkins et al. |
| 5,644,778 | A |   | 7/1997 | Burks et al. |
| 5,715,402 | A | * | 2/1998 | Popolo .......................... 705/37 |
| 5,758,126 | A | * | 5/1998 | Daniels et al. ............... 715/780 |
| 6,115,690 | A | * | 9/2000 | Wong ............................. 705/7 |
| 6,128,315 | A | * | 10/2000 | Takeuchi ..................... 370/466 |
| 6,292,830 | B1 |   | 9/2001 | Taylor et al. |
| 6,314,468 | B1 | * | 11/2001 | Murphy et al. ............... 709/236 |
| 6,418,415 | B1 | * | 7/2002 | Walker ......................... 705/26 |
| 6,658,483 | B1 | * | 12/2003 | Iwamoto et al. ............. 709/246 |
| 7,325,076 | B1 | * | 1/2008 | Morrison et al. ............ 709/246 |
| 7,451,107 | B1 | * | 11/2008 | Chvala et al. .................. 705/37 |
| 2002/0002476 | A1 |   | 1/2002 | Mitsuoka et al. |
| 2002/0032640 | A1 |   | 3/2002 | LaFore et al. |
| 2002/0062262 | A1 | * | 5/2002 | Vasconi et al. ................ 705/26 |
| 2002/0103715 | A1 |   | 8/2002 | Bennett et al. |
| 2003/0014270 | A1 | * | 1/2003 | Qureshi et al. ................. 705/1 |
| 2005/0209950 | A1 |   | 9/2005 | Clark |

FOREIGN PATENT DOCUMENTS

| JP | 11259566 | 9/1999 |
| JP | 2001022832 | 1/2001 |
| JP | 2001256276 | 9/2001 |
| JP | 2002352090 | 12/2002 |
| WO | WO 99/27477 A1 | 6/1999 |

(Continued)

OTHER PUBLICATIONS

ChemConnect, "The World Chemical Exchange", http://www.chemconnect.com/about/index.html., pp. 1-2, 2001.*

(Continued)

*Primary Examiner*—Stefanos Karmis
(74) *Attorney, Agent, or Firm*—Swernofsky Law Group PC

(57) ABSTRACT

The invention provides a method for business to business communication among trading partners that use differing business rules and processes. A trading partner server provides a center for communication between the trading partners enforcing the business rules and enabling the trading partners to communicate effectively. Legally binding and non-legally binding agreements necessary to support a business discourse are handled electronically through the trading partner server.

41 Claims, 2 Drawing Sheets

FOREIGN PATENT DOCUMENTS

| | | |
|---|---|---|
| WO | WO 00/52619 A1 | 9/2000 |
| WO | WO 02/01473 A1 | 1/2002 |
| WO | WO 03/030063 A1 | 4/2003 |

OTHER PUBLICATIONS

Elemica; "Elemica Announces Direct ERP Connection Now Available; Investors to Coonect First, More Customers to Follow Soon", pp. 1-2, Apr. 23, 2001.*

Vertical Industry Portals, "Trading Hubs Take off", (Experts claim the Internet has 150 vertical industry portals in various states of development, which generated $280 mil in revenues in 1998 and are expected to generate $20 bil by 2002); InternetWeek, pp. 1-4, Jan. 25, 1999.*

Descartes.com. "Inventory Demand Matcher". Descartes Products. Sep. 16, 2002.

* cited by examiner

METHOD FOR BUSINESS TO BUSINESS COLLABORATIVE VIRAL ADOPTION

BACKGROUND OF THE INVENTION

1. Field of the Invention

This invention relates to interfacing and communication among trading partners.

2. Related Art

Today's competitive business climate encourages businesses to forge trading partnerships with other businesses. However, finding a trading partner and interfacing with that trading partner in a cooperative and meaningful way is not easy. When using electronic data systems, there is generally a very high level of coordination required. The methods, processes, and systems used by one business entity might turn out to be incompatible with another business entity with whom they wish to collaborate.

In some cases one trading partner may convert its business systems, so as to use the same methods, processes, and business systems used by another trading partner. While this approach generally achieves the goal of interfacing electronic business systems, it is subject to several drawbacks. First, it can often frustrate business practices at the human level. Second, it can require educating employees in a new business system, thus creating an additional expense.

Systems integration can be quite complex at the information systems level. Machine to machine and human to machine interaction can be frustrated by lack of common communications protocols and data formats. While buying new equipment is an option, it involves a substantial added expense, as well as involving the substantial added expense of education of employees in the use of the new equipment.

Accordingly, it would be desirable to provide a technique for allowing trading partnerships to be forged within an electronic communications framework, while allowing each trading partner to retain its unique business methods and processes without compromise of business to business interactions.

SUMMARY OF THE INVENTION

The invention provides a method for business to business communication among trading partners that use differing business rules and processes. Generally, a trading partner is a company, however, it can be an individual or other entity. A trading partner server maintains a directory of trading partners and a business profile associated with each of those trading partners. The business profile includes information regarding attributes descriptive of the trading partner. Attributes includes information regarding rules and processes used by the trading partner, so other potential trading partners can decide if they would like to collaborate with that trading partner. The trading partner server uses information in each trading partner's profile to provide an interface capable of seamless communication between two trading partners regardless of their data systems, rules for doing business, or their business processes.

When one trading partner would like to communicate with another trading partner (such as, for example, to form a trading partner alliance), the first trading partner contacts the trading partner server and requests information regarding the second trading partner. The first trading partner notes the second trading partner's attributes, which might include an appropriate method for first contact. Generally, a first contact is a notice of interest from the first trading partner to the second. The second trading partner may accept or reject the proposed contact.

One trading partner may require that communications it receives use its preferred protocol as designated in its profile. In the event this is not possible, the trading partner server can act as a translator between the two trading partners. Likewise the trading partner server can translate from one set of business practices to another. Examples include: if trading partner A uses gallons on its invoices while trading partner B uses liters, or if trading partner A uses Y2K format dates on its invoices and trading partner B does not. This allows each trading partner to maintain its unique business practices and processes.

The trading partner server not only provides a machine to machine interface but also a machine to human interface. A human being (using a basic technological interface such as text-based email) can interact with a trading partner using machine interface on the trading partner's terms by way of the translation capability of the trading partner server.

The invention provides for updating a trading partner's profile at the trading partner server directory, so that when a trading partner changes a business processes or interfaces it does not have to notify every other trading partner. In that event, the trading partner updates the information in the directory at the trading partner server, whereupon that information is applied automatically to all subsequent communication involving the trading partner.

The invention also allows "legal to legal" communications (that is, binding legal agreements) to be executed substantially automatically, so that new trading partner alliances can be forged relatively efficiently. More informal agreements, such as those not intended to be non-legally binding, or proposals for interaction, can be handled similarly.

DETAILED DESCRIPTION OF THE PREFERRED EMBODIMENT

Figure 1:
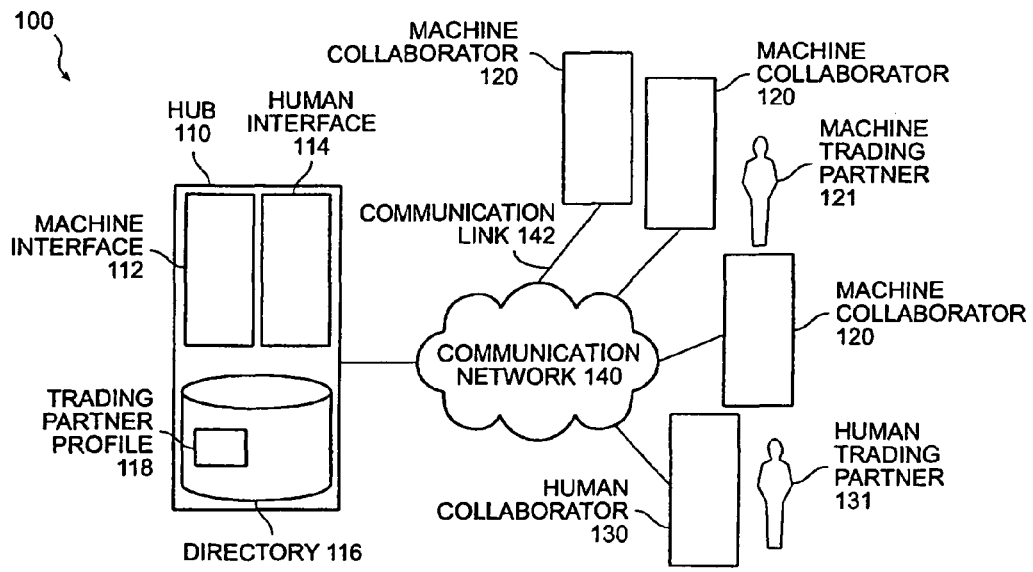
FIG. 1 shows a block diagram of a system for business to business collaborative viral adoption.

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

EDI—Electronic Data Interchange is a standard format for exchanging business data. The standard is ANSI X12 and it was developed by the Data Interchange Standards Association. ANSI X12 is either closely coordinated with or is being merged with an international standard, EDIFACT.

An EDI message contains a string of data elements, each of which represents a singular fact, such as a price, product model number, and so forth, separated by delimiter. The entire string is called a data segment. One or more data segments framed by a header and trailer form a transaction set, which is the EDI unit of transmission (equivalent to a message). A transaction set often consists of what would usually be contained in a typical business document or form. The parties who exchange EDI transmissions are referred to as trading partners.

ERP—Enterprise Resource Planning, a business management system that integrates all facets of the business, including planning, manufacturing, sales, and marketing. As the ERP methodology has become more popular, software applications have emerged to help business managers implement ERP.

RosettaNet—A non-profit organization (www.rosettanet.org) that seeks to implement standards for supply-chain (manager-supplier) transactions on the Internet. Created in Winter 1998, the group includes companies like American Express, Microsoft, Netscape, and IBM, and is working to standardize labels for elements like product descriptions, part numbers, pricing data, and inventory status. The group hopes to implement many of its goals through XML, a mark-up language that lets programmers classify information with tags.

WSDL—The Web Services Description Language (WSDL) is an XML-based language used to describe the services a business offers and to provide a way for individuals and other businesses to access those services electronically. WSDL is the cornerstone of the Universal Description, Discovery, and Integration (UDDI) initiative spearheaded by Microsoft, IBM, and Ariba. UDDI is an XML-based registry for businesses worldwide, which enables businesses to list themselves and their services on the Internet. WSDL is the language used to do this.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for business to business collaborative viral adoption.

A system 100 includes a trading partner server 110, a plurality of machine collaborators 120 each associated with a machine trading partner 121, at least one human collaborator 130 associated with a human trading partner 131, and a communication network 140.

The trading partner server 110 includes a machine interface 112, a human interface 114, a directory 116, a processor, a main memory, and software for executing instructions (not shown, but understood by one skilled in the art). This software preferably includes software for operating the trading partner server 110 consistent with the methods and techniques described and explained further herein.

The machine interface 112 includes software capable of interfacing at least one of the machine collaborators 120 with any other one of the machine collaborators 120.

The human interface 114 includes software capable of interfacing a human collaborator 130 with at least one of the machine collaborators 120.

The directory 116 includes a set of trading partner profiles 118. A trading partner profile 118 is maintained for each known machine collaborators 120 and for human collaborators 130. Each trading partner profile 118 preferably includes the trading partner's preferred method of communication, business processes, business rules, and any other information relating to the business (such as for example, a list of trading partner preferences not found in its business processes or business rules).

The trading partner preferences portion of the trading partner profile 118 includes additional information about the trading partner that other trading partners might find useful in determining whether an alliance should be attempted. Any one or combination of the following could be included: a mission statement, company goal, history of the entity, references to its other trading partners, financial statements, personnel briefs. The trading partner preferences portion is limited only by what the creating trading partner entity wishes to include.

The directory 116 publishes (that is, provides to each trading partner requesting that information) the processes that each trading partner supports. A set of translation engines included in the machine interface 112 and the human interface 114 are responsive to the business rules maintained in the directory 116. Information to record in the directory 116 (such as its preferred set of business rules) is provided on its own behalf by each trading partner. The business rules define how each trading partner will communicate with any other trading partner.

A human collaborator 130 may list as the preferred method of communication plain text messages in a particular format. A machine collaborator 120 may list EDI as the preferred method for communication. Other secondary protocols can also be listed, and a facility at the trading partner server is enabled for allowing negotiation of what protocol will be used. In a preferred embodiment, secondary protocols might include: Java, JavaScript, HTTP (Hypertext Transfer Protocol), and FTP (File Transfer Protocol).

When two trading partners each list different preferred protocols that the other does not support, the trading partner server 110 can recommend a protocol that both entities support by comparing each entity's trading partner profile 118. Alternatively, the trading partner entities can communicate using a common basic protocol (such as Internet email) and negotiate through a written dialog a protocol to be used for further communication.

The machine collaborator 120 includes a processor, a main memory, and software for executing instructions (not shown, but understood by one skilled in the art). This software preferably includes software capable of operating the machine collaborator 120 consistent with the invention and further explained herein.

The machine trading partner 121 refers to one or more persons associated with a business entity running the machine collaborator 120.

The human collaborator 130 includes a processor, a main memory, and software for executing instructions (not shown, but understood by one skilled in the art). This software preferably includes browser and other software capable of operating the machine collaborator 120 consistent with the invention and further explained herein.

The human trading partner 131 refers to one or more persons that use the human collaborator 130.

The communication network 140 includes at least a portion of a communication network, such as a LAN, a WAN, the Internet, an intranet, an extranet, a virtual private network, a virtual switched network, or some combination thereof. In a preferred embodiment, the communication network 140 includes a packet switched network such as the Internet, as well as (in addition to or instead of) the communication networks just noted, or any other set of communication networks that enable the elements described herein to perform the functions described herein.

The communication link 142 operates to couple each machine collaborator 120, human collaborator 130, and the trading partner server 110 to the communications network 140.

The term trading partner(s) is used herein to refer generically to both a machine collaborator 120 and a human collaborator 130.

Trading Partner Server

Figure 2:
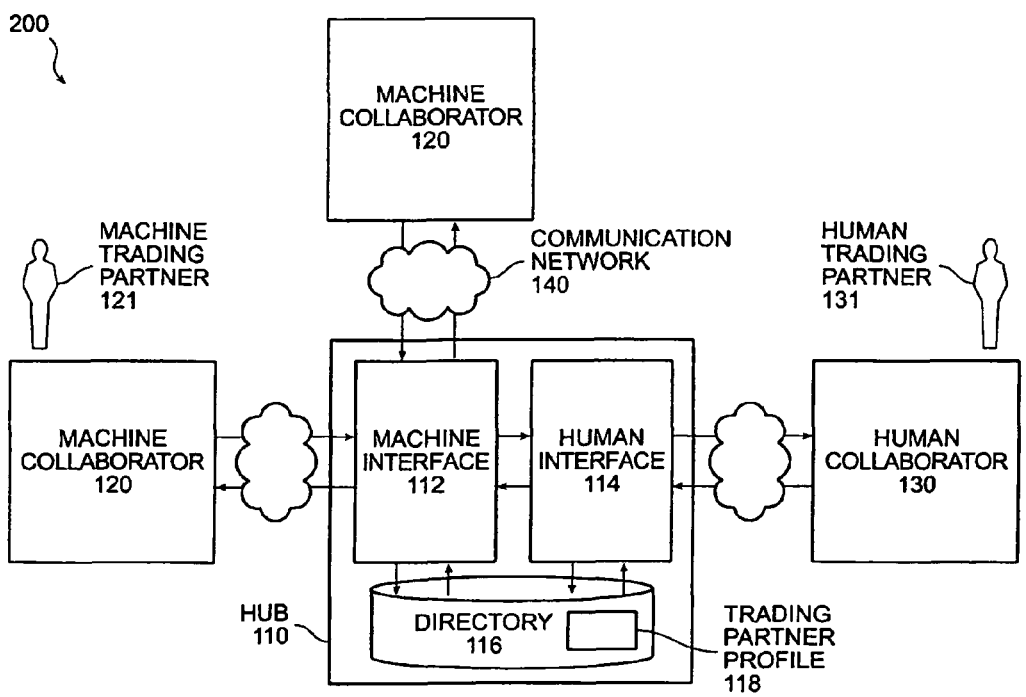
FIG. 2 shows a block diagram of a trading partner server and collaborative devices in a method for business to business collaborative viral adoption.

FIG. 2 shows a block diagram of a trading partner server and collaborative devices in a method for business to business collaborative viral adoption.

The trading partner server 110 is the primary controller for the system 100. Trading partners contact the trading partner server 110 and browse trading partner profiles 118 in the directory 116 for trading partners that interest them and to see if there is a process match.

New trading partners are required to register at the trading partner server by entering all the information necessary to create a trading partner profile 118. Entering the trading partner profile 118 may be accomplished through the use of web forms or similar means.

Already-registered trading partners may edit or delete their trading partner profile 118 on the trading partner server 110. Once a trading partner updates a trading partner profile 118, the trading partner server 110 makes its updated trading partner profile 118 available to current and prospective trading partners. Thus, no other information exchange or retooling is necessary to change a trading partner profile 118. Communication is processed as before, with the trading partner server 110 taking care of any issues relating to communication protocol, business process, and business rules, leaving the individual trading partners free to concentrate on their respective business enterprises.

When a first trading partner has found a second trading partner it is interested in collaborating with, the first trading partner registers its interest in the second trading partner. This interest is either accepted or rejected by the second trading partner.

Once two trading partners have agreed that they have an interest in each other, they can proceed with formalizing the relationship. Legal to legal (L2L) communications can proceed through the trading partner server 110. Documents such as non-disclosure agreements can be handled electronically as can all other workflow product.

The collaborative aspect of day-to-day communication between trading partners (either machine collaborator or human collaborator) is accomplished through the trading partner server 110. The trading partner server 110 provides ongoing translation of each trading partner's business processes into each other trading partner's business processes, and it enforces the business rules specified by each trading partner.

Business Process Translation

Business process translation between two machine collaborators 120 is accomplished by the machine interface 112. For example, if one machine collaborator 120 will only accept data in EDI format and another will only accept data in WSDL the machine interface can provide the translation. As data is received at the trading partner server 110, the destination machine trading partner 121 is looked up in the directory 116. The incoming data is converted to the format acceptable to the destination machine trading partner 121 (as specified by the destination machine trading partner 121), so that conducting business with an external trading partner is as easy as dealing with internal departments using the local computer system.

Business process translation between a machine collaborator 120 and a human collaborator is accomplished by the machine interface 112 and the human interface 114.

For one example, if a relatively large company (for example, "MegaKorp") requires all its purchase orders to be electronically sent and acknowledged using their (relatively expensive) invoicing system regardless of the size of the transaction, in the absence of the invention, those relatively small companies (for example, "Petro's Pizza") who have an Internet connection with email but not the expensive invoicing system would not be able to become a supplier to MegaKorp. By registering at the trading partner server 110 and becoming a human trading partner 131, Petro's Pizza can do business with MegaKorp on MegaKorp's terms, but without investing in the relatively expensive invoicing stem.

In this example, a purchase order from MegaKorp would arrive at the trading partner server 110 through the machine interface 112. Petro's Pizza would be found in the directory 116 along with their associated business processes and rules, and the purchase order would be formatted as an email since Petro's Pizza has only that capability. The email would then be sent to Petro's Pizza via the human interface 114, and Petro's Pizza would respond through the human interface 114. The response to MegaKorp from Petro's Pizza would be received at the trading partner server 110 from the human interface 114. MegaKorp would be located in the directory 116 along with their associated business processes and rules, and the response would be formatted accordingly and sent to MegaKorp via the machine interface 112.

Enforcing Business Rules

As previously mentioned, the directory entry for each trading partner includes not only the preferred formats for data but also the rules that apply for doing business with other trading partners. Using the previous example of Petro's Pizza and MegaKorp, MegaKorp's purchase order process (as specified in the directory 116) might stipulate that an initial purchase order requires a cost estimate response before a final purchase order is sent, which itself requires a confirmation. The system enforces these rules and provides the conduit for fulfilling them.

To continue with the example, when the initial purchase order is received at Petro's Pizza, the human trading partner 131 at Petro's Pizza would be informed in the email that a cost estimate is required. When the final purchase order is received following a cost estimate by Petro's Pizza, a confirmation would be requested of Petro's Pizza. Implementation and enforcement of many business rules can be automated in full or in part by the trading partner server 110. In the example case of Petro's Pizza, the confirmation could be as simple as the human trading partner 131 activating a hypertext link to send the appropriately formatted response to MegaKorp indicating confirmation of their order.

Petro's Pizza is given as an example of the translation process and enforcement of business rules; it is intended to be exemplary and not limiting. The number of business processes and rules that can be incorporated into the system is limitless, and the invention may be used to support ERP and supply-chain management such as RosettaNet.

System Operation

Figure 3:
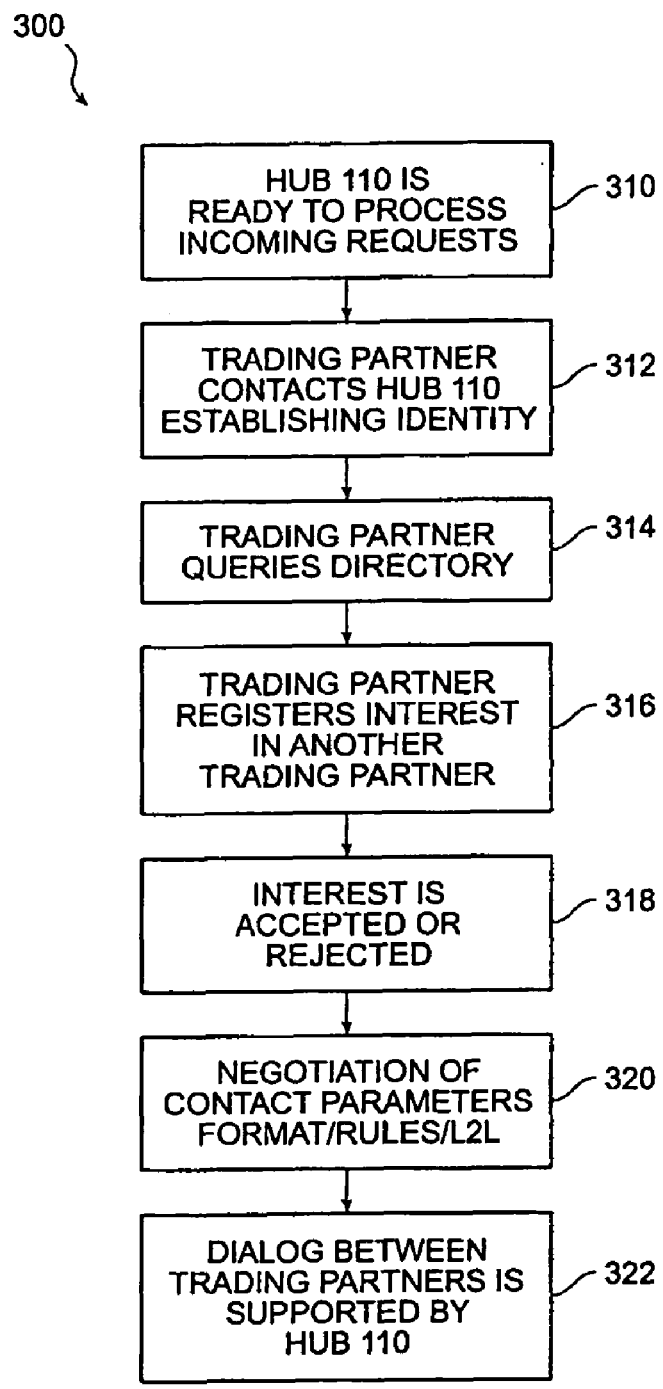
FIG. 3 shows a process flow diagram of a method for business to business collaborative viral adoption.

FIG. 3 shows a process flow diagram of a method for business to business collaborative viral adoption. The method 300 is performed by the system 100. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except were so indicated.

At a flow point 310, the trading partner server 110 is ready to process incoming requests for collaborative contact.

At a step 312, a trading partner (either a human trading partner 131 or machine trading partner 121) contacts the trading partner server 110 and establishes their identity. Establishing identity can include the use of passwords or other authentication techniques.

At a step 314, the trading partner queries the directory 116 for other trading partners that interest them. The information available on other trading partners is limited to what those potential trading partners wish to make available. The available information may be a short introduction or a full-blown company dossier.

At a step 316, the trading partner registers interest in another trading partner they have found in the directory 116.

At a step 318, the second trading partner either accepts or rejects the first trading partner's interest. If the interest is rejected, the process flow may continue at step 310 or the process may be terminated.

At a step 320, negotiation of contact parameters is accomplished. This includes business processes, business rules, legal agreements, fees, and other operational procedures to be followed. The legal to legal portion can include non-disclosure agreements, which can be executed electronically. The electronic nature of the agreement means it may be passed to others when higher authority is required.

At a step 322, dialog between the trading partners is expedited with the trading partner server 110 providing the business to business translation and enforcement of business rules, so that each trading partner can retain their individual identity yet benefit from a business symbiosis.

The process may be repeated starting at step 310.

Generality of the Invention

The invention has applicability and generality to other aspects of business to business communication and collaboration between business entities.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A computer-implemented method for doing business between a first and second trading partner using a trading partner collaboration system, the method including
    maintaining a trading partner server, separate from the first and second trading partners, as primary controller of said trading partner collaboration system,
    storing a first profile and a second profile at said trading partner server, the first profile being associated with the first trading partner and the second profile being associated with the second trading partner, the first profile comprising a first communication protocol for communicating with the first trading partner and business rules data for conducting business with the first trading partner, the second profile comprising a second communication protocol for communicating with the second trading partner;
    receiving a request at said trading partner server for communication between the first trading partner and the second trading partner;
    providing a response by the second trading partner to the request from the first trading partner via the trading partner server, wherein the response accepts or rejects the request; and
    configuring a communications channel for business communications at said trading partner server from said first trading partner to said second trading partner, wherein the communication channel is configured using elements from said second profile;
    wherein said configuring includes receiving a business communication from said first trading partner at said trading partner server by way of an interface at said trading partner server, wherein said business communication is directed at said second trading partner; processing said business communication; and delivering said business communication to said second trading partner by way of a second interface at said trading partner server; and
    automatically updating the communication channel if the first trading partner updates the first profile or the second trading partner updates the second profile;
    wherein the first communication protocol is different from the second communication protocol, and said communications channel enables the first trading partner to communicate with the second trading partner using the first protocol, and the second trading partner to communicate with the first trading partner using the second protocol.

2. The method of claim 1, wherein said first profile further includes some combination of: (1) business processes data, and (2) personal preference data.

3. The method of claim 2, wherein said business processes data includes information relating to how said first trading partner prefers to conduct business.

4. The method of claim 1, the second profile further comprises business rules data for conducting business with the second trading partner.

5. The method of claim 1, wherein said first trading partner is a business entity.

6. The method of claim 1, wherein said first trading partner is a non-business entity.

7. The method of claim 1, wherein said storing includes creating said first profile;
    publishing said first profile at said trading partner server, wherein said publishing allows said first profile to be available to at least one said trading partner; and
    editing said first profile.

8. The method of claim 7, wherein said creating includes a trading partner entering some combination of: (1) business processes data, (2) said business rules data, and (3) personal preference data that are stored in a directory at said trading partner server.

9. The method of claim 7, wherein some portion of said profiles is changed or deleted in a directory at said trading partner server.

10. The method of claim 1, wherein said first trading partner sends the request, the request comprises information for identifying a trading partner with which said first partner has an interest in communicating, the method further comprising:
  identifying said second trading partner based on the information in the request;
  registering at said trading partner server an interest in said second trading partner with said second trading partner, wherein the providing step is based upon the registering step.

11. The method of claim 10, wherein said identifying includes browsing through stored profiles of trading partner at said trading partner server.

12. The method of claim 10, wherein said notification is a request to commit to an agreement.

13. The method of claim 12, wherein said agreement is a non-disclosure agreement.

14. The method of claim 1, wherein said machine interface is a machine interface, said machine interface being capable of interfacing with a business entity using a business communication protocol.

15. The method of claim 1, wherein said first interface is a human interface, said human interface being capable of interfacing with a non-business entity using some combination of: (1) Internet e-mail, (2) File Transfer Protocol, (3) Hypertext Transfer Protocol, (4) Java, and (5) JavaScript.

16. The method of claim 1, wherein said processing includes modifying said business communication using defining elements listed in said second profile of said second trading partner including some combination of: (1) business processes data, (2) said business rules data, and (3) personal preference data.

17. The method of claim 1, wherein said delivering includes using a transmission protocol defined in the second profile of said second trading partner.

18. The method of claim 1, wherein said second interface is a machine interface, said machine interface being capable of interfacing with a business entity using a business communication protocol.

19. The method of claim 1, wherein said second interface is a human interface, said human interface being capable of interfacing with a non-business entity using some combination of: (1) Internet e-mail, (2) File Transfer Protocol, (3) Hypertext Transfer Protocol, (4) Java, and (5) JavaScript.

20. Apparatus for facilitating collaboration of first and second trading partners, including
  means for storing a first profile and a second profile at a trading partner server separate from the first and second trading partners, the first profile being associated with the first trading partner and the second profile being associated with the second trading partner, the first profile comprising a first communication protocol for communicating with the first trading partner and business rules data for conducting business with the first trading partner, the second profile comprising a second communication protocol for communicating with the second trading partner;
  means for receiving a request between the first trading partner and the second trading partner at said trading partner server;
  means for providing a response by the second trading partner to the request from the first trading partner via the trading partner server, wherein the response accepts or rejects the request; and
  means for configuring a communications channel for business communications from said first trading partner to said second trading partner at said trading partner server, wherein the communication channel is configured using elements from the second profile;
  wherein said configuring includes receiving a business communication from said first trading partner at said trading partner server by way of an interface, wherein said business communication is directed at said second trading partner; processing said business communication; and delivering said business communication to said second trading partner by way of a second interface at said trading partner server; and
  means for automatically updating the communication channel if the first trading partner updates the first profile or the second trading partner updates the second profile;
  wherein the first communication protocol is different from the second communication protocol, and said communications channel enables said first trading partner to communicate with said second trading partner using the first communication protocol, and said second partner to communicate with said first partner using the second communication protocol.

21. The apparatus of claim 20, wherein said profile includes some combination of: (1) business processes data, (2) said business rules data, and (3) personal preference data.

22. The apparatus of claim 21, wherein said business processes data includes information relating to how said first trading partner prefers to conduct business.

23. The apparatus of claim 20, the second profile further comprises said business rules data for conducting business with the second trading partner.

24. The apparatus of claim 20, wherein said first trading partner is a business entity.

25. The apparatus of claim 20, wherein said first trading partner is a non-business entity.

26. The apparatus of claim 20, wherein said means for storing includes
  means for creating a profile;
  means for publishing said profile at said trading partner server, wherein said means for publishing allows said profile to be available to at least one trading partner; and
  means for editing a profile.

27. The apparatus of claim 26, wherein said means for creating includes means for a trading partner entering some combination of: (1) business processes data, (2) said business rules data, and (3) personal preference data that are stored in a directory at said trading partner server.

28. The apparatus of claim 26, wherein said means for editing includes means for changing or deleting a profile in a directory at said trading partner server.

29. The apparatus of claim 20, wherein the request comprises information for identifying a trading partner with which said first trading partner has an interest in communicating, and said means for receiving includes
  means for identifying said second trading partner based on the information in the request;
  means for registering at said trading partner server interest of said first trading partner in said second trading partner;
  and wherein said means for providing includes
  means for receiving via said trading partner server in response to said registering a notification, wherein said notification is acceptance of said interest of said first trading partner or rejection of said interest of said first trading partner.

30. The apparatus of claim 29, wherein said means for identifying includes means for browsing through stored profiles of trading partners at said trading partner server.

31. The apparatus of claim 29, wherein said notification is a request to commit to an agreement.

32. The apparatus of claim 31, wherein said agreement is a non-disclosure agreement.

33. The apparatus of claim 20, wherein said first interface is a machine interface.

34. The apparatus of claim 20, wherein said first interface is a human interface, said human interface including means for interfacing with a non-business entity using some combination of: (1) Internet e-mail, (2) File Transfer Protocol, (3) Hypertext Transfer Protocol, (4) Java, and (5) JavaScript.

35. The apparatus of claim 20, wherein said means for processing includes means for modifying said business communication using defining elements listed in said second profile of said second trading partner including some combination of: (1) business processes data, (2) said business rules data, and (3) personal preference data.

36. The apparatus of claim 20, wherein said means for delivering uses the second protocol of said second trading partner.

37. The apparatus of claim 20, wherein said second interface is a machine interface.

38. The apparatus of claim 20, wherein said second interface is a human interface, said human interface including means for interfacing with a non-business entity using some combination of: (1) Internet e-mail, (2) File Transfer Protocol, (3) Hypertext Transfer Protocol, (4) Java, and (5) JavaScript.

39. Computer readable media including written thereon instructions readable by a computer, the instructions, when executed by the computer, enabling the computer to perform the following steps of storing a first profile and a second profile at a trading partner server, the first profile being associated with a first trading partner and the second profile being associated with a second trading partner, the first profile comprising a first communication protocol for communicating with the first trading partner and business rules data for conducting business with the first trading partner, the second profile comprising a second communication protocol for communicating with the second trading partner, wherein said trading partner server is separate from the first trading partner and the second trading partner;

receiving a request at said trading partner server from said first trading partner to communicate with said second trading partner;

providing a response by the second trading partner to the request from the first trading partner via the trading partner server, wherein the response accepts or rejects the request; and configuring a communications channel for business communications at said trading partner server from said first trading partner to said second trading partner, wherein the communication channel is configured using elements from said second profile;

wherein said configuring includes receiving a business communication from said first trading partner at said trading partner server by way of an interface, wherein said business communication is directed at said second trading partner; processing said business communication; and delivering said business communication to said second trading partner by way of a second interface at said trading partner server; and automatically updating the communication channel if the first trading partner updates the first profile or the second trading partner updates the second profile;

wherein the first communication protocol is different from the second communication protocol, and said communications channel enables the first trading partner to communicate with the second trading partner using the first protocol, and the second trading partner to communicate with the first trading partner using the second protocol, the first communication protocol being different from the second communication protocol.

40. The method of claim 2, wherein said first profile comprises a first invoicing rule, said second profile comprises a second invoicing rule, the method further comprising converting invoicing data provided in accordance with the first invoicing rule into invoicing data in accordance with the second invoicing rule.

41. The apparatus of claim 21, wherein said first profile comprises a first invoicing rule, said second profile comprises a second invoicing rule, the apparatus further comprising a converter capable of converting invoicing data provided in accordance with the first invoicing rule into invoicing data in accordance with the second invoicing rule.

* * * * *